Figure 1:
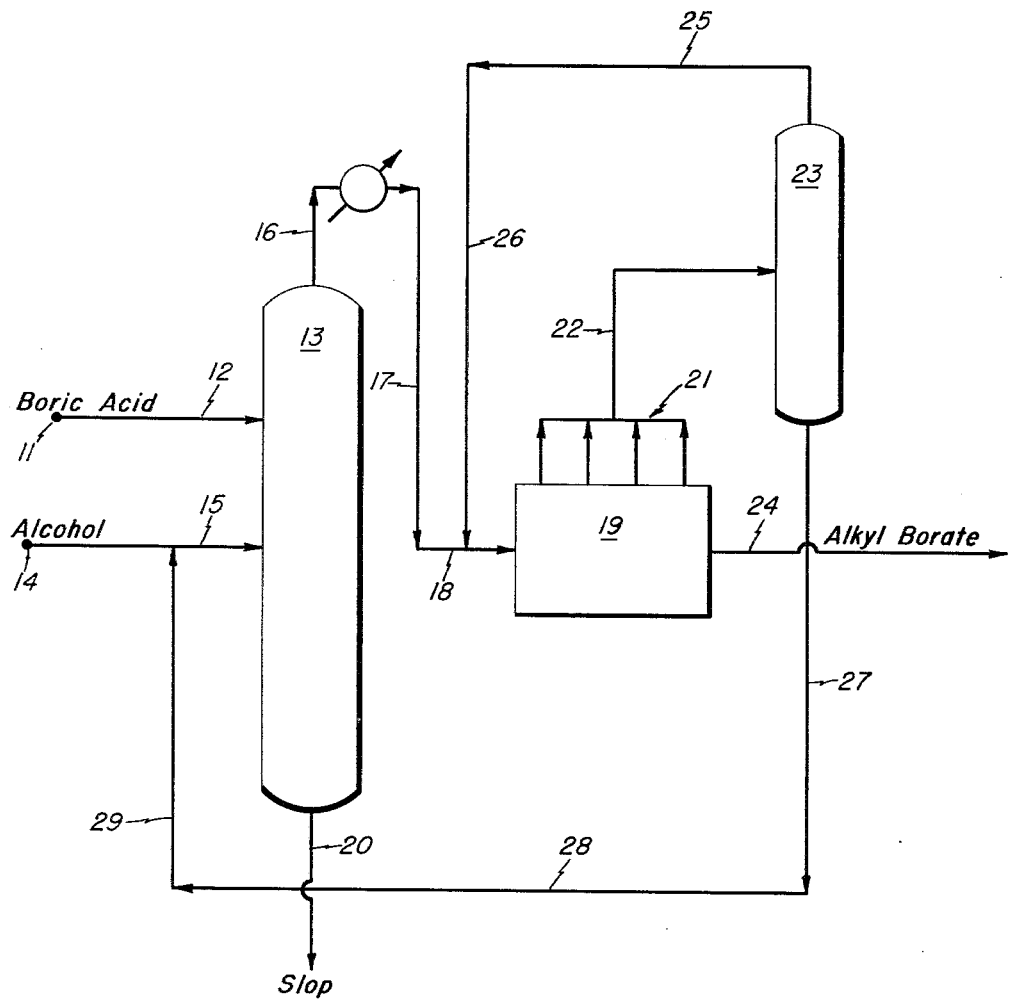

INVENTORS:
Robert C. Binning
Joseph F. Jennings

United States Patent Office 3,230,245
Patented Jan. 18, 1966

3,230,245
RECOVERY OF ALKYL BORATE FROM METHA-
NOL-ALKYL BORATE MIXTURES
Robert C. Binning, Creve Coeur, Mo., and Joseph F.
Jennings, San Antonio, Tex., assignors to Standard Oil
Company, Chicago, Ill., a corporation of Indiana
Filed Aug. 31, 1961, Ser. No. 135,366
11 Claims. (Cl. 260—462)

This invention relates to a process for producing alkyl borates. In particular, it relates to a combination process for producing alkyl borates in which the alkyl borate is recovered from the reaction products by permeation through a plastic membrane. More particularly, it concerns a process for the production of low molecular weight alkyl borates by the esterification of boric acid and an alcohol followed by distillation and permeation to recover the alkyl borate.

Alkyl borates and, in particular, low molecular weight mono-, di-, and trialkyl borates, are used for making borane compounds. These borane compounds are used as high energy aircraft fuel. Since the boiling point and the combustion properties of these boranes vary, the specific borate to be used in making the borane compound will depend upon the type of aircraft engine for which it is intended. Particularly good results have been obtained from the use of trimethyl borate since this compound yields a product having desirable properties. Borane high energy fuels are long chain boron-hydrogen compounds having differing chain links. Like organic compounds derived from petroleum, the molecules of these boranes are very complex.

In manufacturing low molecular weight alkyl borates the normal reaction used is the esterification of boric acid using an alcohol having the same configuration and number of carbon atoms as is desired in the alkyl group or groups of the borate to be formed. Depending upon wether the monoalkyl, dialkyl, or trialkyl borate is to be formed, the reaction conditions will vary. Methods of making these alkyl borates from alcohol and boric acid are known in the art. This esterification reaction can be carried out in a reactor-distillation tower. Normally, the boiling points of the borate and the alcohol are such that the alcohol and water of reaction can be taken overhead and the borate recovered from the bottom. However, in the case of low molecular weight alkyl borates an azeotrope of the alcohol and borate boils below the alcohol, water and other products of the reaction and in order to obtain commercial production it is necessary to recover the borate from the azeotrope.

The commercial method used heretofore of breaking the low molecular weight alkyl borate-alcohol azeotrope, such as trimethyl borate-methanol azeotrope, is a salting out reaction using lithium chloride. In addition to the expense of the use of lithium chloride, the presence of the chloride in the manufacturing process creates a substantial corrosion problem which makes the production of alkyl borates and, in particular, trimethyl borate very expensive. There is a real need for a simple and non-corrosive means for recovering alkyl borates from their constant boiling mixtures with alcohol in order to reduce the cost of the alkyl borates.

We have discovered that alkyl borates can be synthesized by a novel combination process wherein boric acid is esterified with alcohol, the reaction product is distilled to recover an alkyl borate-alcohol azeotrope and the alkyl borate-alcohol azeotrope is separated by membrane permeation using a cellulose derivative as the permeation membrane whereby a substantially pure stream of the alkyl borate is recovered. This process is useful for producing alkyl borates having from 1 to 4 carbon atoms in the alkyl group. This separation can be effected by permeation alone in one or more permeation vessels using the same film or combinations of cellulose derivative films or the separation may be performed by combination permeation-distillation.

While the membrane permeation process for separating organic chemicals is known in the prior art and while a number of specific membranes have been proposed for various separations, heretofore no satisfactory film has been known to be capable of separation of low molecular weight alcohols from alkyl borate. Accordingly, the practice of our invention will make the production of alkyl borates possible by a simple process requiring no extraneous inorganic chemical reactants which are corrosive and which will complicate the recovery.

Figure 2:
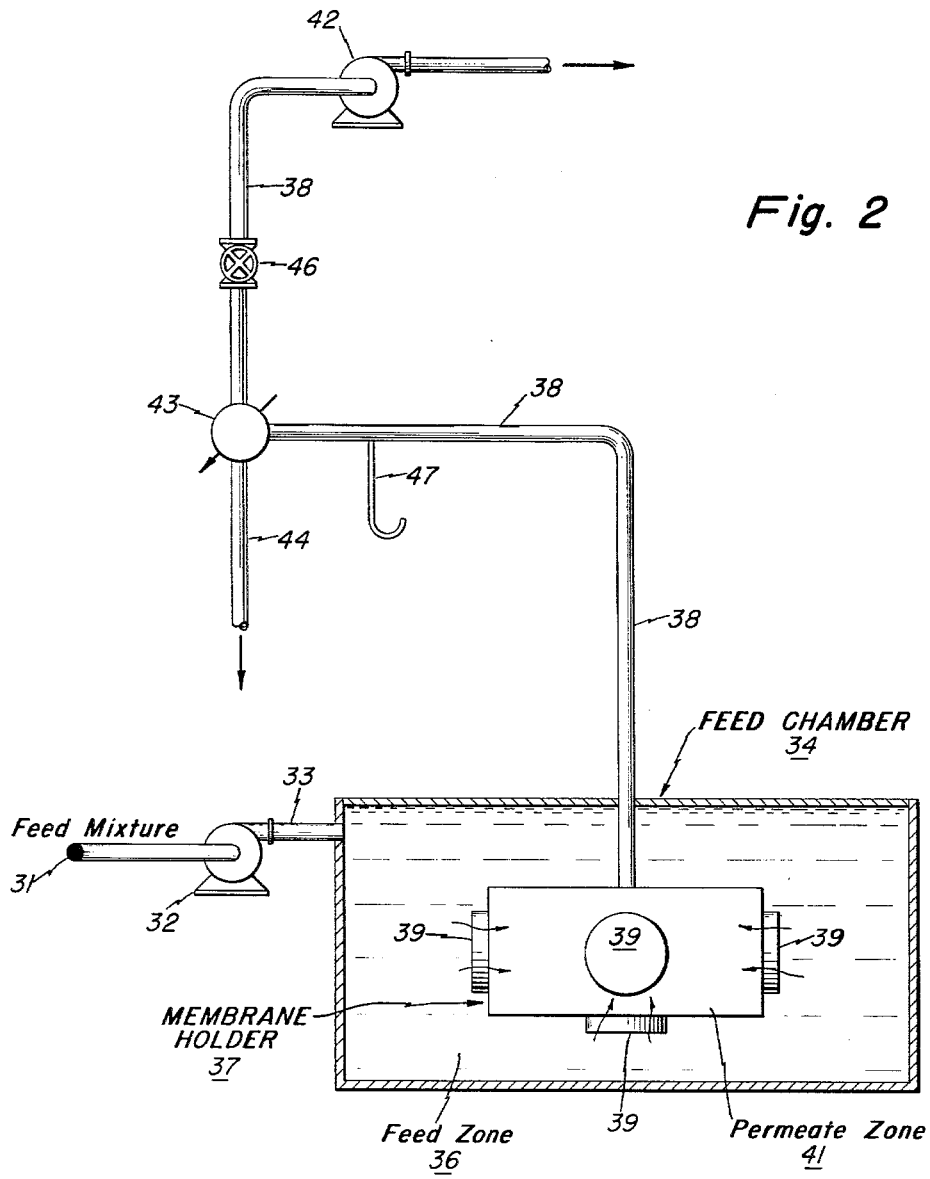

The invention will be more clearly understood from the following illustrative embodiment and the accompanying drawings wherein FIGURE 1 is a schematic flow diagram of the combination process and FIGURE 2 is a diagrammatic representation of the apparatus used in practicing the permeation step of the invention on a laboratory scale.

In this embodiment the esterification of boric acid and methanol is described in the making of trimethyl borate, however, the process is equally applicable to the synthesis of other low molecular weight alkyl borates by esterification of the alcohols having similar alkyl groups. Other low molecular weight alkyl borates which can be produced are the mono-, di-, and trialkyl borates containing methyl, ethyl, propyl, isopropyl, butyl and isobutyl alkyl groups. Either all the alkyl groups may be the same or mixtures of alkyl groups may occur. Mixed alkyl borates can be obtained by first esterifying with the alcohol followed by esterification of the mono- or diborate to produce the mixed alkyl borate. Or the mixed esters may be obtained by esterifying with mixed alcohols. Depending upon the boiling point of the azeotrope of the alcohol and the particular alkyl borate being synthesized, the azeotrope of the alcohol and the borate may be taken overhead from the reaction tower or withdrawn from the bottom. In either case, an azeotrope of the borate and alcohol is produced which needs to be separated in order to recover the alkyl borate for subsequent use in making the borane compounds. Thus the alcohols which can be used in the esterification reaction are methanol, ethanol, n-propanol, isopropanol, and normal or branched chain butanol.

In FIGURE 1 the manufacture of trimethyl borate is illustrated. Boric acid is charged from source 11 through line 12 to reaction-distillation zone 13, and methanol is added from source 14 by line 15. While about 8 mols of alcohol are preferably added for each mol of boric acid in order to get complete conversion, mol ratios between 3:1 to 10:1 will be found satisfactory. The temperature and pressure in reaction-distillation zone 13 are such that the esterification of the boric acid and alcohol proceeds and an ester-alcohol azeotrope is removed overhead through lines 16, 17 and 18 and passed to permeation zone 19. Water and unreacted products are removed from the bottom of reaction-distillation zone 13 by line 20 and can be sent to a recovery zone, not shown. The esterification reaction is carried out at reflux temperature with an overhead temperature of about 131° F. While a combination reaction-distillation zone is used in this illustration, separate zones may also be used. In addition, the process may be carried out by batch esterification or continuous esterification. Since the boric acid is a solid at room temperature it may be added as a solid by means of a chute or suspended in an inert solvent or methanol or as a liquid in methanol solution. In permeation zone 19 the ester-alcohol azeotrope is introduced in the feed zone and brought in contact in the liquid state with a cellulose derivative membrane which separates the feed zone from the permeate zone and a permeated portion is withdrawn through manifold 21 and line 22 to distillation column 23. Due to the preferential solubility of methanol in the membrane, the permeated portion will be enriched with methanol. The substantially pure trimethyl borate product is withdrawn as a non-permeated portion from permeation zone 19 by line 24. From distillation zone 23 the trimethyl borate-methanol azeotrope is taken overhead through lines 25 and 26 and recycled to permeation zone 19 via line 18. Substantially pure methanol is withdrawn from distillation zone 23 and recycled to the charge to reaction-distillation zone 13 via lines 27, 28 and 29.

In carrying out the permeation step the feed mixture to be separated is introduced in the liquid state into the feed zone of the permeation apparatus. The permeation apparatus is comprised essentially of a cellulose derivative membrane which separates the feed zone from the permeate zone. The mixture in the feed zone cannot pass through to the permeate zone except by permeation through the membrane. Because of differences in solubility and permeation rates of the components of the feed mixture in and through the membrane, the permeated mixture will be enriched in the component of the feed mixture which is more soluble in the membrane. The non-permeated fraction will be depleted in this component and enriched in the remaining component(s). The feed mixture is maintained in the liquid phase by suitable adjustment of temperature and/or pressure. The permeated mixture is maintained in the vapor state by the proper adjustment of temperature and/or pressure. The feed mixture may be continuously or intermittently introduced into the feed zone and the permeated mixture is preferably continuously removed from the permeate zone. Non-permeated portion may also be continuously or intermittently withdrawn from the permeation apparatus. In order to obtain a separation of the feed mixture into its components, it is of course esesntial that only a portion of the feed mixture be permeated through the membrane. From as little as 5 to as much as 95% of the feed may be permeated, depending upon the extent of purity desired. A number of permeation stages may be used.

The pressure in the feed zone is adjusted so that at the permeation operating temperature, the feed mixture is maintained in the liquid state. Thus a pressure in the feed zone of from atmospheric to 100–500 p.s.i.g. may be used. While the permeate zone is operated at a pressure such that the permeated mixture is in the vapor state under the particular operating temperatures used, it is preferred to maintain the permeate zone at a sub-atmospheric pressure since a greater degree of separation is thereby attained. While maintenance of the feed mixture in the liquid phase while in contact with the membrane increases the likelihood of rupture of the membrane, much higher permeation rates are obtained thereby than if the feed mixture were in the vapor phase, and is comprised essentially of the thin permeation membrane which separates the feed zone from the permeation zone.

Membranes which are useful for separating the alkyl borates from the corresponding alcohol are made from high molecular weight esters and ethers of cellulose. The cellulose esters include cellulose acetate, cellulose triacetate, cellulose propionate, celluose butyrate, and cellulose acetate-butyrate. Cellulose ethers which are useful include methyl cellulose, ethyl cellulose, propyl cellulose, butyl cellulose and methyl-amyl cellulose. Cellulose esters can be prepared by reacting cellulosic material, such as cotton linters, with appropriate acids, anhydrides and a trace of $H_2SO_4$ acid as the catalyst. The ester is recovered, purified and cast into films from solvent solution. Cellulose ethers can be prepared by reacting purified cotton or wood cellulose with caustic soda solution to form alkali cellulose. The alkali cellulose is then reacted at elevated temperatures under pressure with an alkyl sulfate or chloride, such as methyl chloride when making methyl cellulose. The degree of substitution with the alkyl chloride is approximately two groups per anhydroglucose residue in the cellulose chain. The cellulose ether is recovered, purified and cast into films from solvent solution.

Since the rate of permeation increases as the thickness of the membrane decreases, it is desirable to employ very thin membranes of the order of 0.1 to 5 mils, usually on the order of 0.5 to 1 mil or thereabouts. The membrane must be free of any pin holes, tears, etc. which would destroy the continuity of membrane surface; for the presence of pin holes and the like would allow the liquid mixture to pass through in gross amounts and destroy selectivity.

In FIGURE 2, which diagrammatically represents a form of the apparatus used in practicing the permeation step of the invention on a laboratory scale, the feed from source 31 is pumped by way of pump 32 through line 33 into feed chamber 34. Pump 32 is operated at a pressure to maintain the feed mixture in line 33 and in feed zone 36 in the liquid phase. The absolute pressure in line 33 and in feed zone 36 is determined by pressure measuring devices not shown herein. Membrane holder 37 is positioned within feed chamber 34 and has a box-type design with a circular opening in each of five of its faces. A threaded brass ring surrounds each opening and extends outwardly from the plane of the surface of the membrane holder to form a cylindrical extending threaded wall with a flat shoulder. A fine mesh screen wire is supported and soldered across each opening and the membrane is placed over each of the openings. A knurled brass ring fitting threaded on the inside is then used to seal the membrane to the shoulder of the cylindrical wall and thus form a leakproof seal so that the feed mixture can only enter into the interior of the membrane holder by permeating through the membrane. A line 38 is attached to the top face of membrane holder 37 for the withdrawal of the permeated mixture which permeates from the feed zone 36 through membrane 39 into permeate zone 41. A subatmospheric pressure is maintained in line 38 and permeate zone 41 by means of vacuum pump 42. The permeated mixture is removed in the vapor state from permeate zone 41 by means of line 38 and pass through an acetone-dry ice condenser 43 wherein the permeated mixture is liquefied and removed by way of line 44. Needle valve 46 and manometer 47 are positioned in line 38 to assist in regulating and measuring the absolute pressure in line 38 and permeate zone 41.

A number of experiments were carried out using the above-described laboratory apparatus to demonstrate the permeation portion of my combination process. In these runs cellulose triacetate and methyl cellulose were used as the permeation membranes. The experimental technique consisted of introducing the liquid feed mixture into the feed zone of the permeation apparatus at the desired temperature. The feed mixture was maintained in the liquid phase in the feed zone. The pressure in the feed zone was 50 lbs. The permeate zone was maintained at an absolute pressure of 100 mm. Hg. In carrying out the experiments the permeation runs were begun and allowed to line out before measurements of the permeation rate and composition of the permeate were made. The thickness of the films used are indicated in the table. Since the permeation rate in all instances was calculated based upon a one mil thickness of the membrane, the variation in rate due to membrane thickness was eliminated and permeation rates are expressed in a manner based upon a standard membrane thickness.

The conditions of these runs and the results are shown in the following table:

| Run No. | 1<br>Cellulose[1]<br>triacetate | 2<br>Cellulose[1]<br>triacetate | 3<br>Methyl[2]<br>cellulose |
|---|---|---|---|
| Film used | | | |
| Film thickness, mils | 0.6 | 0.6 | 0.7 |
| Permeation Temp., °F | 140 | 140 | 136 |
| Permeate Press., mm. Hg | 100 | 100 | 100 |
| Permeation Rate, lbs./hr./1,000 sq.[3] | 600 | 600 | 2,800 |
| Feed: | | | |
| Trimethyl borate, wt. percent | 74.7 | 74.7 | 79.5 |
| Methanol, wt. percent | 25.3 | 25.3 | 20.9 |
| Amount permeated, wt. percent | 28.9 | 28.3 | 22.0 |
| Trimethyl borate in Non-Permeate | 97.0 | 97.4 | 88.7 |
| Trimethyl borate in Permeate | 19.0 | 18.1 | 44.0 |

[1] Distillation Industries (TA-435-3).
[2] Dow Chemical's Methocel MC (27.5-32% methoxy groups.)

What we claim is:

1. A process for the production of alkyl borates by esterification of boric acid with a lower aliphatic alcohol containing from 1 to 4 carbon atoms which comprises reacting the boric acid with the lower aliphatic alcohol under esterification conditions in a reaction zone, recovering an azeotrope comprising a mixture of unreacted alcohol with alkyl borate product from the reaction zone, charging the azeotrope as feed to a permeation apparatus having a feed zone and a permeate zone separated by a thin plastic membrane having preferential solubility for the unreacted alcohol in the azeotrope, maintaining the azeotrope in the feed zone in the liquid phase under permeation conditions, withdrawing a permeated portion of the feed which has been enriched in the alcohol from the permeate zone and withdrawing a nonpermeated portion of the feed which has been enriched in the alkyl borate as the product.

2. The process of claim 1 wherein the permeated portion is distilled to recover a purified alcohol fraction which is recycled to the reaction zone and an alcohol borate-alcohol azeotrope fraction which is recycled to the feed zone of the permeation apparatus.

3. The process of claim 1 wherein the alkyl borate is a monoalkyl borate.

4. The process of claim 1 wherein the alkyl borate is a dialkyl borate.

5. The process of claim 1 wherein the alkyl borate is a trialkyl borate.

6. The process of claim 1 wherein the cellulose derivative membrane is a cellulose ester.

7. The process of claim 1 wherein the cellulose derivative membrane is a cellulose ether.

8. The process of claim 1 wherein the cellulose derivative membrane is cellulose triacetate.

9. The process of claim 1 wherein the cellulose derivative membrane is methyl cellulose.

10. A process for the production of trimethyl borate which comprises esterifying boric acid and methanol under esterification conditions to produce a reaction mixture containing trimethyl borate and methanol, distilling a trimethyl borate-methanol azeotrope from at least a portion of the reaction mixture, subjecting the trimethyl borate-methanol azeotrope to membrane permeation under permeation conditions in the feed zone of a permeation apparatus, which feed zone is separated from a permeate zone by a thin plastic membrane of a cellulose derivative selected from the group consisting of a cellulose triacetate and methyl cellulose, withdrawing a permeated portion enriched in methanol from the permeate zone and withdrawing a nonpermeated portion of substantially pure trimethyl borate as the product, distilling the permeated portion to obtain essentially pure methanol as a bottoms product which is recycled to the charge to the esterification reaction and a trimethyl borate-methanol azeotrope overhead product which is recycled to the feed zone of the permeation apparatus.

11. A process for separating trimethyl borate from methanol which process comprises introducing the mixture in the liquid state into the feed zone of a permeation apparatus that is separated from a permeate zone of said apparatus by a thin plastic membrane of a polymer selected from the group consisting of cellulose triacetate and methyl cellulose, permeating a portion of the liquid in the feed zone through the membrane into the permeate zone, withdrawing from the permeate zone a vaporous permeated product which is enriched in methanol and withdrawing from the feed zone a liquid nonpermeated product enriched in trimethyl borate.

References Cited by the Examiner

UNITED STATES PATENTS 3,024,264  3/1962  Petterson _____ 260—462

OTHER REFERENCES

Hackh's Chemical Dictionary, 3rd ed., 1944, page 521.

CHARLES B. PARKER, *Primary Examiner.*

L. D. ROSDOL, *Examiner.*